United States Patent
Kosaka et al.

(10) Patent No.: US 6,867,909 B2
(45) Date of Patent: *Mar. 15, 2005

(54) FILTER WITH VARIABLE TRANSMISSION CHARACTER, OPTICAL TRANSMISSION EQUIPMENT AND METHOD OF OPTICAL TRANSMISSION

(75) Inventors: Junya Kosaka, Yokohama (JP); Daisuke Yoshida, Yokohama (JP)

(73) Assignee: Hitachi, Ltd. (JP)

( * ) Notice: Subject to any disclaimer, the term of this patent is extended or adjusted under 35 U.S.C. 154(b) by 65 days.

This patent is subject to a terminal disclaimer.

(21) Appl. No.: 10/421,567

(22) Filed: Apr. 23, 2003

(65) Prior Publication Data

US 2003/0193714 A1 Oct. 16, 2003

Related U.S. Application Data (63) Continuation of application No. 09/609,595, filed on Jul. 5, 2000, now Pat. No. 6,580,550.

(30) Foreign Application Priority Data

Jul. 6, 1999 (JP) .......................................... 11-191230

(51) Int. Cl.[7] ............................................... H01S 3/00
(52) U.S. Cl. .................................. 359/337.11; 359/349
(58) Field of Search .............................. 359/337.1, 349, 359/337.11

(56) References Cited

U.S. PATENT DOCUMENTS

| | | | |
|---|---|---|---|
| 5,541,766 A | 7/1996 | Mizrahi et al. ............. | 359/337 |
| 5,557,442 A | 9/1996 | Huber ......................... | 359/179 |
| 5,675,432 A | 10/1997 | Kosaka ....................... | 359/341 |
| 5,696,859 A | 12/1997 | Onaka et al. ................ | 385/24 |
| 5,706,125 A | 1/1998 | Nakano ....................... | 359/341 |
| 5,900,969 A | 5/1999 | Srivastava et al. .......... | 359/341 |
| 5,914,795 A | 6/1999 | Jourdan et al. ............. | 359/134 |
| 5,986,800 A | 11/1999 | Kosaka ....................... | 359/341 |
| 5,987,200 A | 11/1999 | Fleming et al. ................ | 385/37 |
| 5,991,071 A | 11/1999 | Naito .......................... | 359/341 |
| 6,049,417 A | 4/2000 | Srivastava et al. .......... | 359/341 |
| 6,088,501 A | 7/2000 | Delrosso ..................... | 385/134 |
| 6,097,535 A | 8/2000 | Terahara ..................... | 359/341 |
| 6,115,156 A | 9/2000 | Otani et al. ................. | 359/124 |
| 6,151,157 A | 11/2000 | Ball et al. .................... | 359/341 |
| 6,249,365 B1 | 6/2001 | Mizrahi et al. ............. | 359/130 |
| 6,268,955 B1 | 7/2001 | Shimojoh et al. ......... | 359/337.2 |
| 6,275,629 B1 | 8/2001 | Elggleton et al. ............. | 385/37 |
| 6,282,361 B1 | 8/2001 | Nishimura et al. .......... | 385/140 |
| 6,297,902 B1 | 10/2001 | Kosaka et al. .............. | 359/337 |
| 6,307,668 B1 | 10/2001 | Bastien et al. ........... | 359/337.1 |
| 6,313,941 B1 | 11/2001 | Suzuki et al. ............... | 359/337 |
| 6,333,807 B1 | 12/2001 | Hatayama et al. .......... | 359/308 |
| 6,335,821 B1 | 1/2002 | Suzuki et al. .......... | 359/337.11 |
| 6,344,914 B1 | 2/2002 | Shimojoh et al. ........... | 359/177 |
| 6,580,550 B1 * | 6/2003 | Kosaka et al. ............ | 359/337.1 |

FOREIGN PATENT DOCUMENTS

| | | | |
|---|---|---|---|
| EP | 0917313 | 5/1999 | ...................... 14/2 |
| JP | 11150526 | 6/1999 | |

* cited by examiner

Primary Examiner—Mark Hellner
(74) Attorney, Agent, or Firm—Sofer & Haroun, LLP (57) ABSTRACT

In order to obtain optical transmission equipment for wavelength division multiplexing for providing a small inter-wavelength deviation regardless of a change in an input level, an amplification band is divided with wavelengths at inflection points in a wavelength gain characteristic of an impurity-doped fiber. The equipment includes an optical filter unit and a optical gain adjusting unit. The optical filter unit obtains filter characteristics associated with wavelength gain characteristics for a plurality of input levels by changing a temperature thereof. The optical gain adjusting unit includes a wavelength gain characteristic shift filter having a Peltier element for controlling the temperate of the optical filter unit.

8 Claims, 9 Drawing Sheets

RELATIONSHIP BETWEEN WAVELENGTH AND GAIN OF AN
ER-DOPED FIBER (EDF) IN AN O2 ZONE, WITH
INPUT LEVEL AS A PARAMETER

FIG. 5

CURVE APPROXIMATING TO ALL POINTS OF FOUR
WAVELENGTH GAIN CURVES OF FIG. 5

FIG. 6

INVERSION GRAPH OF FIGURE 6 SHOWING THE
INSERTION LOSS CHARACTERISTICS OF AN
OPTICAL FIBER

FILTER WITH VARIABLE TRANSMISSION CHARACTER, OPTICAL TRANSMISSION EQUIPMENT AND METHOD OF OPTICAL TRANSMISSION

CROSS-REFERENCE TO RELATED APPLICATION

This application is a continuation of U.S. patent application filed on Jul. 5, 2000 under the Ser. No. 09/609,595 now U.S. Pat. No. 6,580,550 which claims the priority benefits from the Japanese Patent Application No. 11-191230 filed on Jul. 6, 1999. The content of the application is incorporated herein by reference

BACKGROUND OF THE INVENTION

The present invention relates to optical transmission equipment and more particularly, to a wavelength gain characteristic shift slope filter, optical transmission equipment and optical transmission method, which are suitable for wavelength division multiplexing.

In order to cope with rapid increase of traffic involved by rapid spread of the Internet, dense wavelength division multiplexing (DWDM) has been implemented in North America. The implementation of the DWDM is due to the fact that an optical amplifier for use in collective amplification of wavelength division multiplexing light has an amplification band. However, the gain of the optical amplifier depends on wavelength and further the wavelength dependency also varies depending on its input level. For this reason, the current wavelength division multiplexing cannot use the full amplification band of the optical amplifier and can use only a band called "red band" having a relatively flat gain wavelength dependency.

In this connection, the articles associated with the invention of the present application are U.S. Pat. Nos. 5,675,432 and 5,987,200 and U.S. application Ser. No. 09/191,051 (JP-A-11-150526), the description of the articles being hereby incorporated by reference. Described in the U.S. Pat. No. 5,987,200 is a multiplexing/demultiplexing device of a narrow-band Bragg grating type which can change add/drop wavelengths by changing the temperature of a fiber grating.

SUMMARY OF THE INVENTION

It is an object of the present invention to implement a wavelength gain characteristic shift slope filter which dynamically equalizes its gain according to its input level. Another object of the present invention is to provide optical transmission equipment which is suitable for wavelength division multiplexing. A yet object of the present invention is to provide an optical transmission method which is suitable for wavelength division multiplexing.

The above objects can be attained by providing a wavelength gain characteristic shift slope filter which includes a filter section for obtaining filter characteristics associated with wavelength gain characteristics for a plurality of input levels thereof by changing the temperature of the optical amplifier and which also includes a Peltier element for controlling the temperature of the filter section. The above objects can be attained also by providing optical transmission equipment which includes wavelength gain characteristic shift slope filters for compensating for wavelength gain characteristics according to the input levels, optical gain adjusters, and optical amplifiers for amplifying optical signals having a plurality of wavelengths. The above objects are attained also by providing optical transmission equipment wherein an amplification band is divided with wavelengths providing inflection points to a wavelength gain characteristic of at least an impurity-doped fiber to adjust its gain for each of the divided wavelength bands.

BRIEF DESCRIPTION OF THE DRAWINGS

Preferred embodiments of the present invention will now be described in conjunction with the accompanying drawings, in which.

DESCRIPTION OF THE EMBODIMENTS

Embodiments of the present invention will be explained by referring to the attached drawings.

Figure 1:
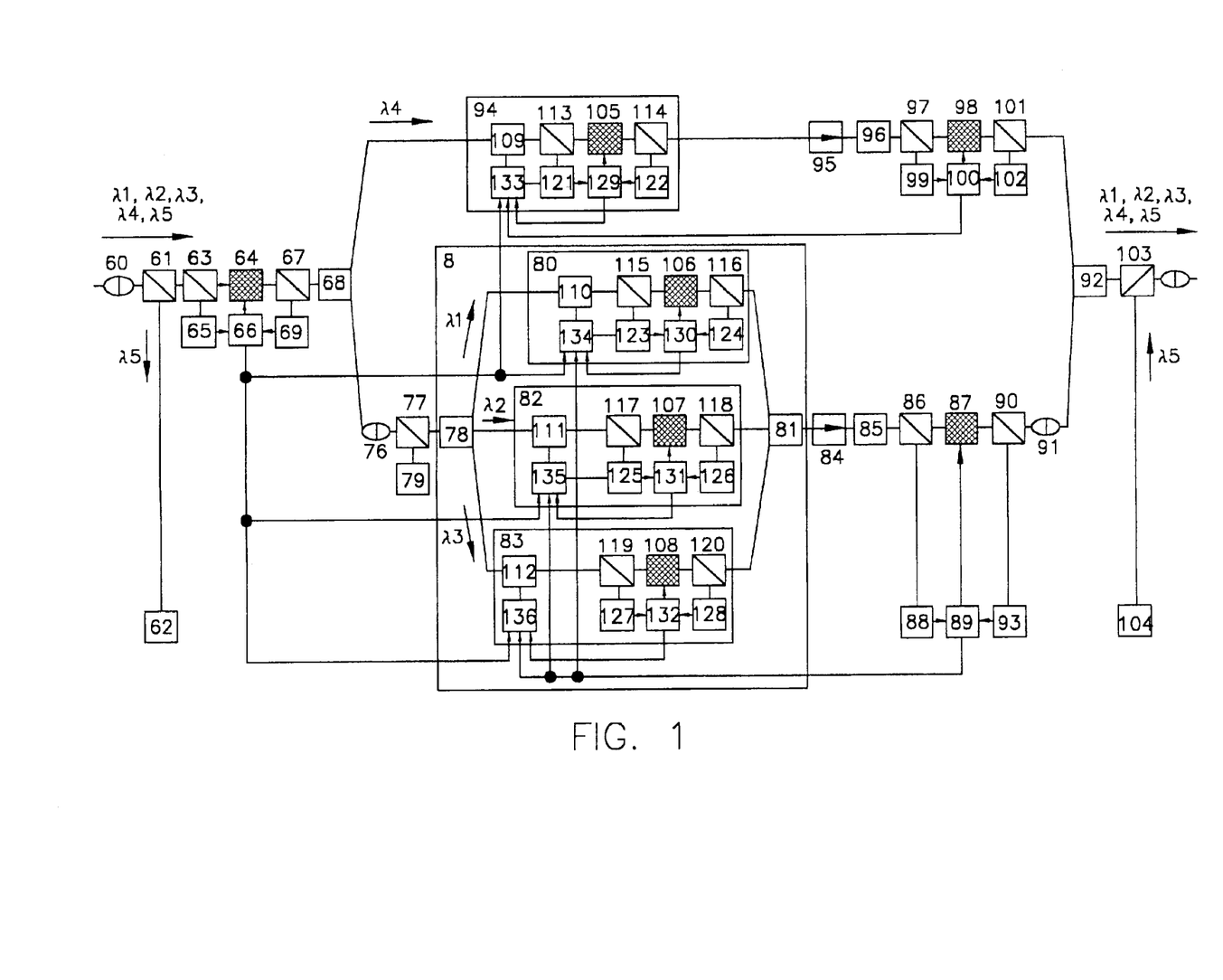
FIG. 1 is a block diagram of optical transmission equipment in accordance with an embodiment of the present invention.

FIG. 1 is a block diagram of optical transmission equipment in accordance with an embodiment of the present invention.

In the present embodiment, a wavelength band of a optical signal supplied from a light transmitter 1 has $\lambda 1=1531 \pm 1.5$ nm, $\lambda 2=1534 \pm 1.5$ nm, $\lambda 3=1537 \pm 1.5$ nm, $\lambda 4=1549.5 \pm 11$ nm, and $\lambda 5=1510 \pm 10$ nm. The $\lambda 5$ is a wavelength band of monitor light standardized by the International Telecommunications Union-Telecommunications standardization sector (ITU-T), and the $\lambda 1$ to $\lambda 4$ are wavelength bands of optical signal. It is assumed therein that a boundary wavelength between the wavelength bands of the optical signal provides an inflection point to a wavelength-gain characteristic of Er-doped fiber (EDF) of an optical amplifier, the reason of which will be explained later. The bands $\lambda 1$ to $\lambda 5$ are convenient divisions merely for the purpose of explaining the effects of the present invention, and thus the respective wavelength bands are not necessarily limited to the shown divisions but may be further divided into sub-divisions. Further, more or less signal wavelengths may be multiplexed into each band. Furthermore, the band λ5 may be a band having a center wavelength of 1480 nm.

An input optical signal Pin having the multiplexed bands λ1 to λ5 is passed through an optical connector 60 between an actual line (which has been alrelady constructed) and transmission equipment, and then optically demultiplexed by a first monitor light wavelength demultiplexer/multiplexer 61 into λ1 to λ4 and λ5. The demultiplexed λ5 signal is transmitted to a first line monitoring device 62.

The λ1 to λ4 signals, on the other hand, are applied to a first optical amplifier 64 via a first optical splitter 63. The split light by the first optical splitter 63 is detected by a first light receiver 65 as a first light monitor signal, and then sent to a first controller 66.

A light signal amplified by the first optical amplifier 64 is split by a second optical splitter 67 and thereafter applied to a first optical demultiplexer 68. The demultiplexed optical signal is detected by a second light receiver 69 as a second light monitor signal and then the signal is sent to the first controller 66. The first optical demultiplexer 68 demultiplexes its input light into bands λ1 to λ3 and a band λ4, and sends a signal indicative of the bands λ1 to λ3 to a first branch path and a signal indicative of the band λ4 to a second branch path.

Detailed explanation will now be made as to the first optical demultiplexer 68 with reference to FIG. 2.

Figure 2:
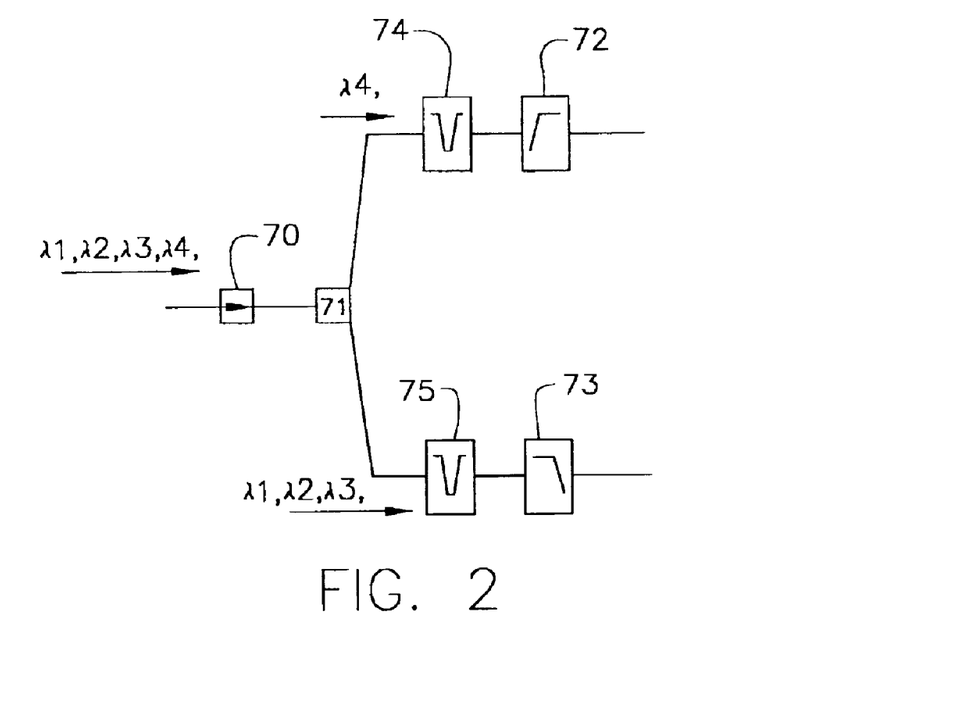
FIG. 2 is a block diagram of an optical demultiplexer applied to the embodiment of the present invention.

FIG. 2 is a block diagram of the first optical demultiplexer 68. In the first optical demultiplexer 68, the input light λ1 to λ4 signal is first applied to an optical isolator 70. A optical signal passed through the optical isolator 70 is demultiplexed and branched by the optical splitter 71 into two paths. Provided in the respective paths are optical notch filters 74 and 75 to remove such light components that are adjacent to their pass bands and cannot be eliminated only by optical filters 72 and 73.

A optical signal passed through the optical notch filters 74 and 75 are further passed through the optical filters 72 and 73 to shield optical signal components out of their bands. In order to effectively shield optical signal located at one adjacent grid of the in-band optical signal, fiber Bragg grating type filters were employed as the optical notch filters 74 and 75 in the present arrangement. When the fiber Bragg grating type optical notch filters 74 and 75 are used, reflected light generally regresses in a direction opposed to the advancing direction of the optical signal. For the purpose of avoiding this, the optical isolator 70 is also provided at a preceding stage of the optical splitter 71 in this arrangement.

The optical notch filters 74 and 75 for shielding optical signal located at one adjacent grid of the in-pass-band optical signal are used. This is because noise light out of the pass band exercising the worst influence on the pass band is the optical signal adjacent to the pass band and thus it is important to remove such optical signal.

More effectively, it is desirable to connect broader-band optical notch filters to remove a plurality of adjacent optical signal or to connect the in cascade optical notch filters to shield the plurality of optical signals, respectively.

The use of the optical multiplexer according to the embodiment can make the cross-talk between the in-band and out-of-band signals 30 dB or more apart. Further, the first optical demultiplexer 68 in the present arrangement is advantageous in that the demultiplexer can continuously divide a band without skipping a wavelength grid as its feature, and thus can effectively utilize the wavelength band of the optical amplifier. Thereby a cost of the optical transmission equipment per wavelength can be reduced with an increased merit.

Turning back to FIG. 1, explanation will be made as to amplification processes of the bands λ1, λ2 and λ3 along the first path. The optical transmission equipment of the present embodiment can adjust the wavelength bands independently. In order to enable separation of functions of adjusting and amplifying the wavelength bands λ1 to λ3 by utilizing the feature, optical connectors 76 and 91 are provided in the first path.

A optical signal of the bands λ1 to λ3 passed through the optical connector 76 is partly split by a third optical splitter 77 and then applied to a second optical demultiplexer 78. The split signal is detected by a third light receiver 79. With this arrangement, connection and disconnection of the optical connector 76 can be monitored.

The second optical demultiplexer 78 demultiplexes its input signal into the bands λ1, λ2 and λ3, and sends the band λ1 signal to a third path, the band λ2 signal to a fourth path and the band λ3 signal to a fifth path. The second optical demultiplexer 78 is substantially the same in structure as the optical demultiplexer 68, but different only in that the splitter 71 has the three branched paths. The demultiplexed λ1 signal is supplied into a first optical gain controller 80, adjusted to a predetermined gain, and then sent to a third optical multiplexer 81. The third optical multiplexer 31 is substantially the same in arrangement as the optical demultiplexer 78, but different only in that their inputs and outputs are opposite and the optical isolator is omitted. Similarly, the λ2 and λ3 band signals are sent to second and third optical gain controllers 82 and 83, adjusted to their predetermined gains, and then sent to the third optical multiplexer 81.

A optical signal corresponding to a re-multiplexing of the λ1 to λ3 band signals, while shielding influences of reflected light from optical parts at subsequent stages, is passed through an optical isolator 84 simuntaneously effective to the optical signals of the bands λ1 to λ3 and then applied to a dispersion compensator 85. The dispersion compensator 85 has a characteristic inverse to a dispersion characteristic inherent in a line optical fiber, and if the compensator is unnecessary depending on the type of the line optical fiber, then it may be omitted. Optical connectors may be provided at both ends of the dispersion compensator 85 to make the compensator detachable. With it, a dispersion compensator suitable for the line can be exchangeably inserted. Even in this case, the effects of the present invention will not be lost.

A optical signal issued from the dispersion compensator 85 is partly split by a fourth optical splitter 86 and sent to a second optical amplifier 87 for its amplification. The other split light is detected by a fourth light receiver 88 as a third light monitor signal, and then sent to a second controller 89.

The amplified optical signal, on the other hand, is partly demultiplexed by a fifth optical splitter 90, passed through an optical connector 91, and then sent to a fourth optical multiplexer 92. The other split light is detected by a fifth light receiver 93 as a fourth light monitor signal and then sent to the second controller 89.

Explanation will next be made as to the λ4 band amplification process along the second path.

The λ4 band optical signal is supplied into a fourth optical gain controller 94, adjusted to a predetermined gain, passed through an optical isolator 95, and then sent to a second dispersion compensator 96. An output optical signal issued from the second dispersion compensator 96 is partly split by a sixth optical splitter 97 and then amplified by a third optical amplifier 98. The split light is detected by a sixth light receiver 99 as a fifth light monitor signal and sent to a third controller 100. The amplified optical signal is partly split by a seventh optical splitter 101 and then sent to the fourth optical multiplexer 92. The other split light is detected by a seventh light receiver 102 as a sixth light monitor signal, and then sent to the third controller 100.

The $\lambda 1$–$\lambda 3$ band optical signal is multiplexed by the fourth optical multiplexer 92 together with the amplified $\lambda 4$ band optical signal into the $\lambda 1$–$\lambda 4$ band optical signal. And the $\lambda 1$–$\lambda 4$ band optical signal is multiplexed by a second monitor light multiplexer 103 together with the monitor light $\lambda 5$ band signal received from a second line monitoring device 104, and then output to a line via an optical connector 151.

Optical connectors may be provided at both ends of the second dispersion compensator 96 to make the compensator detachable. Thereby a dispersion compensator having a characteristic suitable for the line can be exchangeably inserted.

As already explained above, the present embodiment is arranged to be adjusted independently for the respective wavelength bands, the band $\lambda 4$ signal is amplified and transmitted at the initial stage of being installed as transmission equipment. In a desirable application, it is preferable to transmit the optical signal having the wavelength band $\lambda 4$ and the monitor light having the wavelength band $\lambda 5$ at the initial installation stage, and to transmit the optical signal having the wavelength bands $\lambda 1$ to $\lambda 3$ at the extension stage.

This is because optical amplifiers are designed to cope with a maximum wavelength multiplexing number, whereas the transmission system is operated, in many cases, with a smaller wavelength multiplexing number at the initial stage of installation of the transmission system. In other words, this is because a line shortage or an increase in the transmission capacity not takes place temporarily but gradually increases in many cases. Since the transmission equipment of the present embodiment can adjust wavelength bands independently, there can be realized an optical transmission system which can cope with even an increase in the transmission capacity in future with a low initial investment.

Simultaneously, this realization of independent adjustment means that an expansion in the system will not have influences on facilities already being operated as a big merit.

In some application, it is considered preferable to transmit the optical signals of the bands $\lambda 1$ to $\lambda 3$ and the monitor optical signal of the band $\lambda 5$ at the first stage and to transmit the signal of the band $\lambda 4$ at the second stage. In this case, such an arrangement is possible that optical connectors are provided between the first optical demultiplexer 68 and fourth optical gain controller 94 and at the preceding stage of the fourth optical multiplexer 92 on the second path.

The function of the optical gain controller as another embodiment of the present invention will next be explained in detail by referring again to FIG. 1. In the drawing, the optical gain controller corresponds to a part denoted by reference numeral 80, 82, 83 or 94. Explanation will be made herein only as to the fourth optical gain controller 94, but the same explanation holds true for the other optical gain controllers 80, 82 and 83. The fourth optical gain controller 94 includes an optical gain adjuster 105, a wavelength gain characteristic shift slope filter 109, an optical splitter 113, a light receiver 121 for receiving light split by the optical splitter 113, a controller 129 for controlling the optical gain adjuster 105 on the basis of monitor information received from the light receiver 121, and wavelength gain characteristic shift slope filter controller 133 for controlling the wavelength gain characteristic shift slope filter 109.

Fixed gain characteristics resulting from passive parts of all parts within the optical amplifier will not cause relatively large problem. The most important and biggest problem in actual use is such a phenomenon that the gain characteristic of a light amplifying medium within the optical amplifier is fluctuated largely by a power input to the transmission equipment. It is generally known that the gain deviation of an optical amplifier varies depending on a signal gain.

Meanwhile, from the viewpoint of preventing nonlinear effects of transmission fiber and realizing a longer-distance transmission in line design, it is demanded to limit the output level of the transmission equipment within a predetermined range. Therefore a variation in the input power causes a variation of a predetermined gain of the optical amplifier, resulting in a great change in its gain characteristic.

The optical gain adjuster 105 of the present embodiment can adjust inter-wavelength gain deviations caused by the first and third optical amplifiers 64 and 98 independently. This optical gain adjuster will be explained with reference to FIG. 3. The drawing is a block diagram of a structure of the optical gain adjuster for explanation thereof. The optical gain adjuster 105 is made up of an Er-doped fiber (EDF) 301, an exciting light source 302, and an optical multiplexer 303. Although a light emitting diode emitting light having a wavelength of 820 nm has been used as the exciting light source in the present embodiment, diode emitting light having a wavelength of 1480 nm or 980 nm or any laser diode may be employed.

Figure 3:
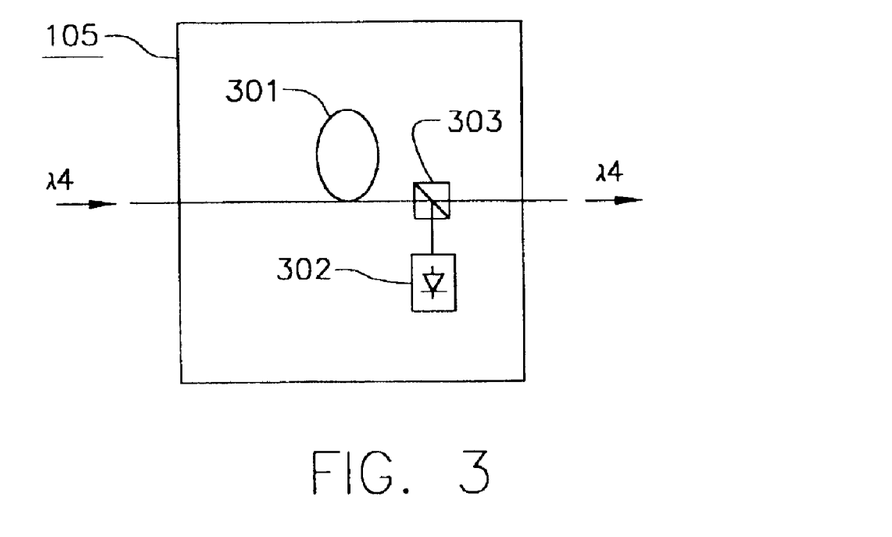
FIG. 3 is a block diagram of an optical gain adjuster in the embodiment of the invention for explaining a structure thereof.

When the exciting light source 302 is put in its high excitation state, exciting light emitted from the exciting light source 302 is directed to the EDF 301 from its back end at the multiplexer 303 to excite the EDF 301. A optical signal having the wavelength band $\lambda 4$ is directed to the EDF 301 from its front end, amplified and then output. When the exciting light source 302 is put in its low excited state or not put in its light emission state, on the other hand, the EDF 301 attenuates the optical signal. In other words, the optical gain adjuster 105 functions as an optical gain adjuster having a positive or negative gain by adjusting an exciting current of the exciting light source 302.

In this case, since the EDF 301 does not require an excessive amplification characteristic, the fiber is only required to be as long as about 3 m. Further, the light emitting diode of 830 nm used as the exciting light source 302 is only required to have an output power of about 20 mW.

The wavelength gain characteristic shift slope filter of the present embodiment complements its function in combination with the optical gain adjuster to drastically improve its effect. More specifically, a generated gain deviation is first corrected by the optical gain adjuster independently for the respective wavelength bands. The gain deviation not completely corrected by the optical gain adjuster is further corrected by the wavelength gain characteristic shift slope filter.

Figure 4:
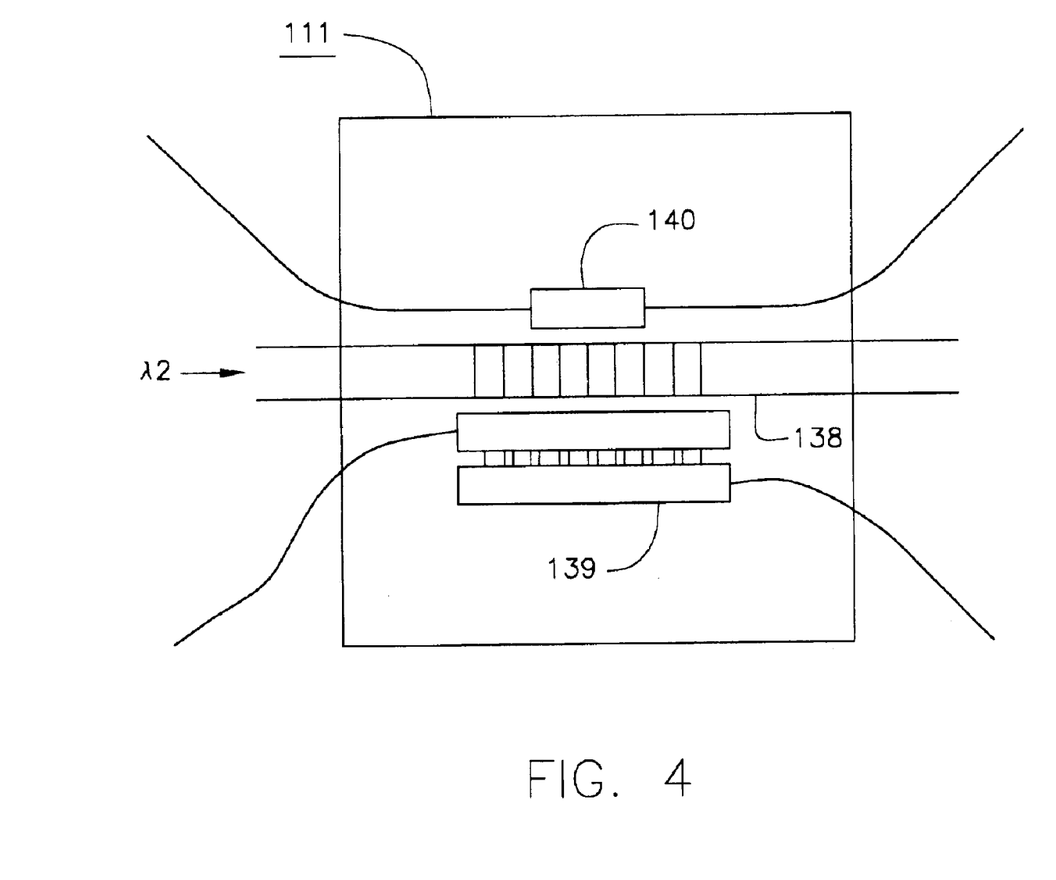
FIG. 4 is a block diagram of a wavelength gain characteristic shift slope filter in the embodiment of the present invention.

The structure of the above optical gain auxiliary adjuster will be explained by referring to FIG. 4 showing a block diagram of the wavelength gain characteristic shift slope filter.

Although explanation will be made below as to the wavelength band $\lambda 2$ as an example, the same holds true even for the other wavelength bands.

The wavelength gain characteristic shift slope filter 111 includes the optical filter 138 having a temperature dependency, a Peltier element 139 as a temperature adjuster, and a thermistor resistance 140 for detecting the temperature of the optical filter 138. In this case, an etalon filter or a fiber Bragg grating type filter can be used as the optical filter 138. However, any type of filter may be employed so long as it does not depart from the gist of the present invention. In the present embodiment, a fiber Bragg grating type filter called "long period grating" is employed as a device having a high temperature dependency.

Figure 5:
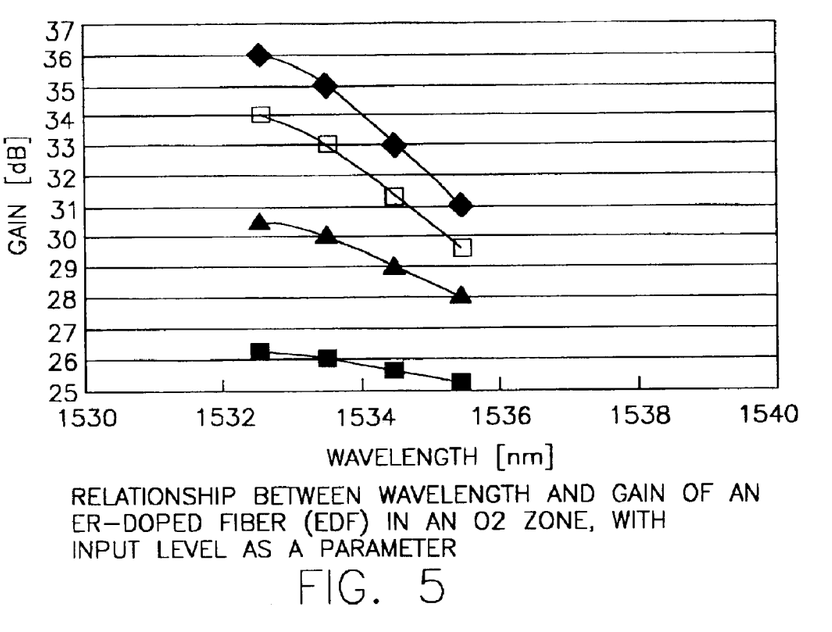
FIG. 5 shows curves plotting a relationship between wavelength and gain of an Er-doped fiber (EDF) in a $\lambda 2$ zone in the embodiment of the present invention with changing an input level as a parameter.

Next detailed explanation will be made as to how to design characteristics of the fiber Bragg grating type filter, by referring to FIGS. 5 to 7. FIG. 5 shows wavelength-gain curves of an EDF found with an input level as a parameter, FIG. 6 is a curve obtained continuously arranging the four wavelength-gain curves of FIG. 5, and FIG. 7 is a curve corresponding to an upside-down version of FIG. 6, which is the filter characteristic curve.

FIG. 5 is a curve plotting input levels as parameters, showing a relationship between the wavelength and gain of the EDF in the λ2 band. In the illustrated curve, the curve having a gain 36 dB at 1532.5 nm has a lowest input level, while the curve having a gain of 26 dB at 1532.5 nm has a highest input level. As will be clear from the drawing, a change in the input level to the EDF causes a great change in the gain characteristic in the wavelength band.

Figure 6:
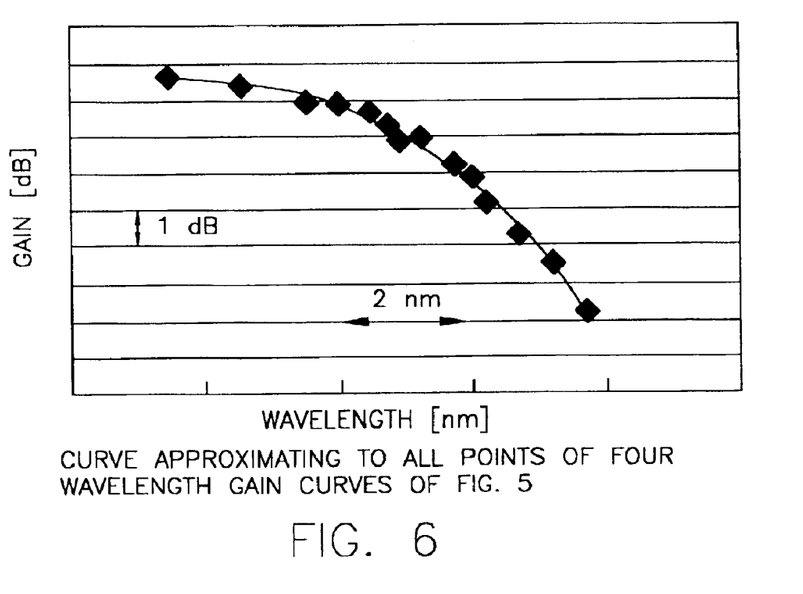
FIG. 6 is a curve approximating to all points of four wavelength-gain curves in the embodiment of the present invention by shifting the curves a little in a wavelength axis direction while maintaining shapes of their curves.

FIG. 6 is an approximation curve depicted by shifting the four wavelength-gain curves of FIG. 5 little by little in their wavelength axis direction while maintaining their shapes and by approximating all points to the approximation curve. This means that the curve of FIG. 6 is reproduced by continuously shifting the curves showing variations in the gain characteristic generated in the same λ2 wavelength band in the wavelength axis direction.

Figure 7:
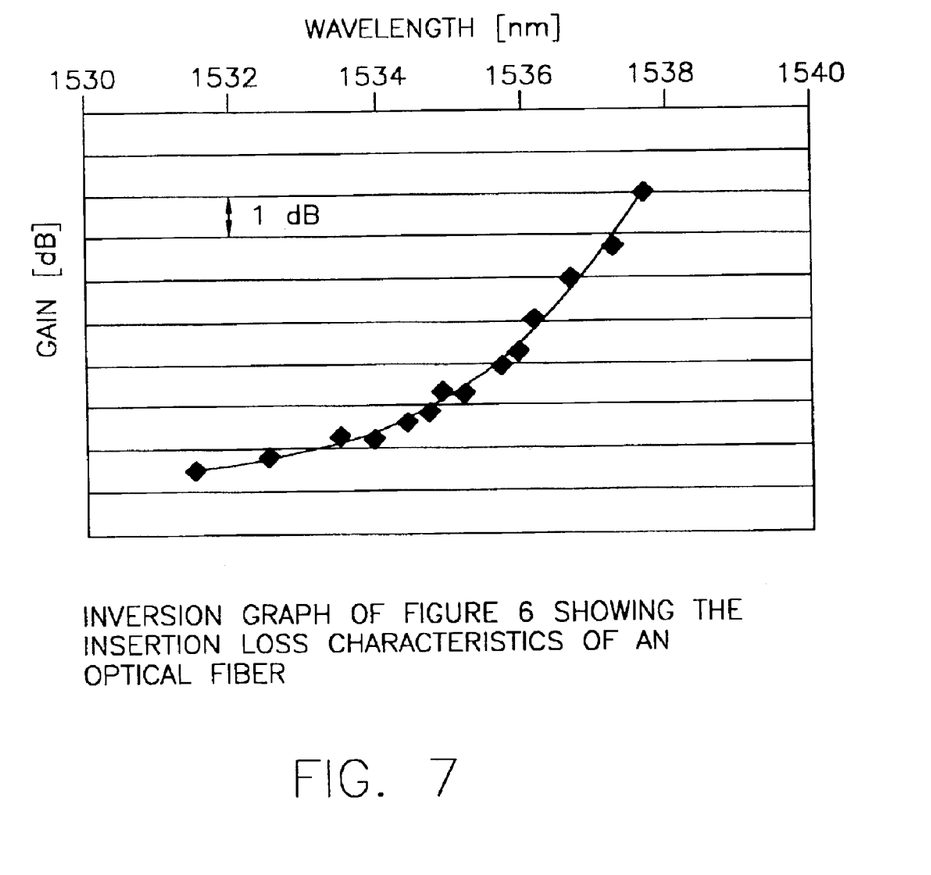
FIG. 7 is a graph showing an insertion loss characteristic of an optical filter 138 in the embodiment of the present invention.

Next FIG. 7 is a graph showing an insertion loss characteristic of the optical filter 138 and inversed to that of FIG. 6. In the present embodiment, the filter is able to be designed with an accuracy of 0.1 dB.

Further, the λ2 wavelength band is originally 3 nm, but the optical filter 138 has a band of 7 nm and a loss characteristic corresponding to all the input levels shown in FIG. 5.

The fiber Bragg grating type filter of the present embodiment has a temperature characteristic of 0.08 nm/° C. and can shift its wavelength by 4 nm by providing a temperature change of about 50° C. by means of the Peltier element. More specifically, when the variable temperature zone has a center temperature of 25° C., the center of the 7 nm band of the optical filter 138 is made to coincide with the central wavelength of the λ2 band at 25° C. As a result, the loss characteristic of the optical filter can be varied by −2 nm by shifting the temperature by 25° C. toward its lower temperature side and by +2 nm by shifting the temperature by 25° C. toward its higher temperature side.

By referring to FIGS. 4, 5 and 7, the function of the wavelength gain characteristic shift slope filter 111 will be explained. When its input level is small, the optical amplifier providing a constant output level provides a large gain to the optical signal, which results in that a gain deviation depending on wavelengths becomes large as shown by the uppermost curve in FIG. 5. At this time, the Peltier element 139 in FIG. 4 acts to increase the temperature, thereby increasing the temperature of the optical filter 138. The temperature increase causes filter characteristic of the optical filter 138 to be shifted to the higher wavelength side in FIG. 7, thereby enabling compensation for the inter-wavelength deviation of the gain.

It goes without saying that, although the temperature characteristic of the filter has been set at 0.08 nm/° C. in the present embodiment, the temperature change range can be made narrow by employing a device having a large temperature dependency. On the contrary, when the filter temperature characteristic is set at 0.01 nm/° C. or more, since a shift of 0.5 nm ca be obtained in a temperature range of 0–50° C., the effect of the present invention can be sufficiently obtained in some wavelength band.

Meanwhile, such unit of nm/° C. is merely a representation means for approximating a characteristic for easy understanding and expression and thus the characteristic may be of a negative or vary with the temperature zone. For example, such a device can be employed that the characteristic is set at +0.01 nm/° C., −0.01 nm/° C., 0.03 nm/° C. in a range of 0–20° C., or 0.09 nm/° C. in a range of 20–50° C.

Where to put a boundary between the wavelength hands already mentioned earlier in the embodiment is important, which will be explained below. In order to realize a suitable continuous loss characteristic of wavelength gain characteristic shift slope filter with a very small error only by shifting the wavelength, it is important not to include an inflection point in the gain characteristic of the wavelength band. In the present invention, to this end, the boundary between the wavelength bands for the optical signals is set to such a wavelength as to give an inflection point to the wavelength-gain characteristic of the EDF of the optical amplifier. As has been mentioned already above, however, additional subdivision of the wavelength bands is possible. When the wavelength bands are divided more finely, the filter characteristic can be controlled in a narrow variable temperature range.

As a method for controlling the filter characteristic more effectively, it is considered to connect such wavelength gain characteristic shift slope filters as mentioned above in cascade. For example, when the above wavelength gain characteristic shift slope filter at the preceding state and the wavelength gain characteristic shift slope filter at the subsequent stage are controlled to have respectively different wavelength characteristics, a more complex wavelength characteristic can be realized.

Figure 11:
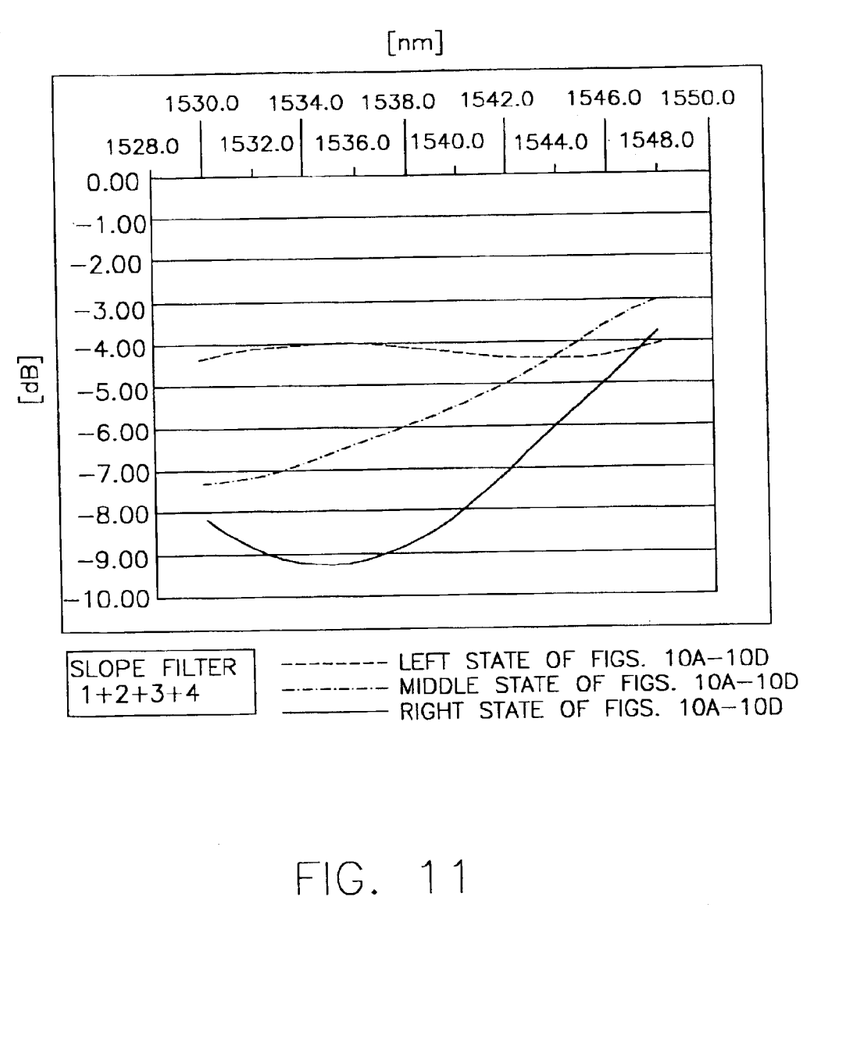
FIG. 11 shows wavelength transmission characteristics of slope filters 1 to 4 connected in cascade.

An embodiment of the optical gain auxiliary adjuster of the present invention will be explained with use of FIGS. 10A to 10D and 11. In more detail, FIGS. 10A, 10B, 10C and 10D show three temperature types of wavelength transmission characteristics in four types of filters, respectively. FIG. 11 is a diagram for explaining a wavelength transmission characteristic of the four types of filters of FIGS. 10A to 10D connected in cascade.

In FIGS. 10A to 10D, their ordinate denotes insertion loss (dB) and abscissa denotes wavelength (nm). The diagrams horizontally arranged in respective four types of filters not necessarily correspond to the same temperature sets. The present embodiment is the same in shifting the slope of the wavelength transmission characteristic as in the foregoing embodiment, but different therefrom in that the temperatures of the four filters are independently varied to change their characteristics and these characteristics are overlapped in cascade. According to this embodiment, the filters 1, 2, 3 and 4 are all independently varied, as will be clear from FIGS. 10A to 10D.

FIG. 11 shows a characteristic corresponding to an combination of the slope characteristics of the four filters of FIGS. 10A to 10D connected in cascade. That is, FIG. 11 shows slope characteristics obtained when the three states of each of the four filters of FIGS. 10A to 10D are overlapped. It will be clearly appreciated from FIG. 11 that the slope characteristic can be effectively made varied.

With such an arrangement, the slope characteristic of the filter can be made varied more easily and effectively. It is desirable that the slope characteristics of the filters be designed independently so that the overlapped slope characteristic can have a desired slope.

Explanation will be made as to how to actually control the optical gain adjuster and wavelength gain characteristic shift slope filter as means for implementing the present invention, by referring again to FIG. 1.

The optical amplifiers of the present embodiment are intended to perform such control operation that an optical output level of the optical amplifier for each signal to be eventually output to the line becomes constant independently of the input level to the optical amplifier.

The dispersion compensator has such an input power restriction that introduction of light at a level of a predetermined value or more causes observation of a signal waveform distortion phenomenon due to the nonlinear effect of the light. In the present embodiment, in order to avoid this phenomenon, the signal input level of the dispersion compensator is controlled to be +0 dBm or less for each signal.

First, the first optical amplifier 64 can find an amplification gain by monitoring its input and output levels, and the gain is controllably adjusted by the first controller 66 according to the input level. For example, when the input level is a lowest level of −30 dBm, the gain is controlled to be about 30 dB. When the input level is +5 dBm, its gain is controlled to be about 5 dB.

Next the optical gain adjusters 105, 106, 107 and 108 monitor their optical output levels and control their output to be as constant as +0 dBm or less for each signal wavelength. At this time, the gains of the optical gain adjusters 105, 106, 107 and 108 are determined to have predetermined values. The determined amplified or attenuated gains can be monitored on input monitors to the optical gain adjusters 105, 106, 107 and 108.

Subsequently the optical signal passed through this path is passed through the dispersion compensator 85 and then amplified by the second optical amplifier 87. The second optical amplifier 87 controls its output such that its line light output level becomes as constant as +8 dBm per each signal wavelength. The gain of the second optical amplifier 87 is determined by the loss of the dispersion compensator 85. The determined amplified gain can be monitored on an input monitor to the second optical amplifier 87.

In this manner, the gain from the input of the optical amplifier to the output thereof is determined for each path, and these gain information are collected at wavelength gain characteristic shift slope filter controllers 133, 134, 135 and 136.

Assuming for example that the first optical amplifier 64 has a gain of 25 dB, the optical gain adjusters 105, 106, 107 and 108 have a gain of 10 dB, and the second optical amplifier 87 has a gain of 18 dB; then these gain information are collected at the wavelength gain characteristic shift slope filter controllers 133, 134, 135 and 136.

As already explained earlier, the gain deviation varies depending on the gain of the optical amplifier.

Adjustments of the wavelength gain characteristic shift slope filters 109, 110, 111 and 112 to the respective gains are previously set; and the wavelength gain characteristic shift slope filters 109, 110, 111 and 112 are controlled by the wavelength gain characteristic shift slope filter controllers 133, 134, 135 and 136 to perform predetermined adjusting operation based on the detected gain information.

Similar control to the above is carried out even for the fourth path.

Figure 8:
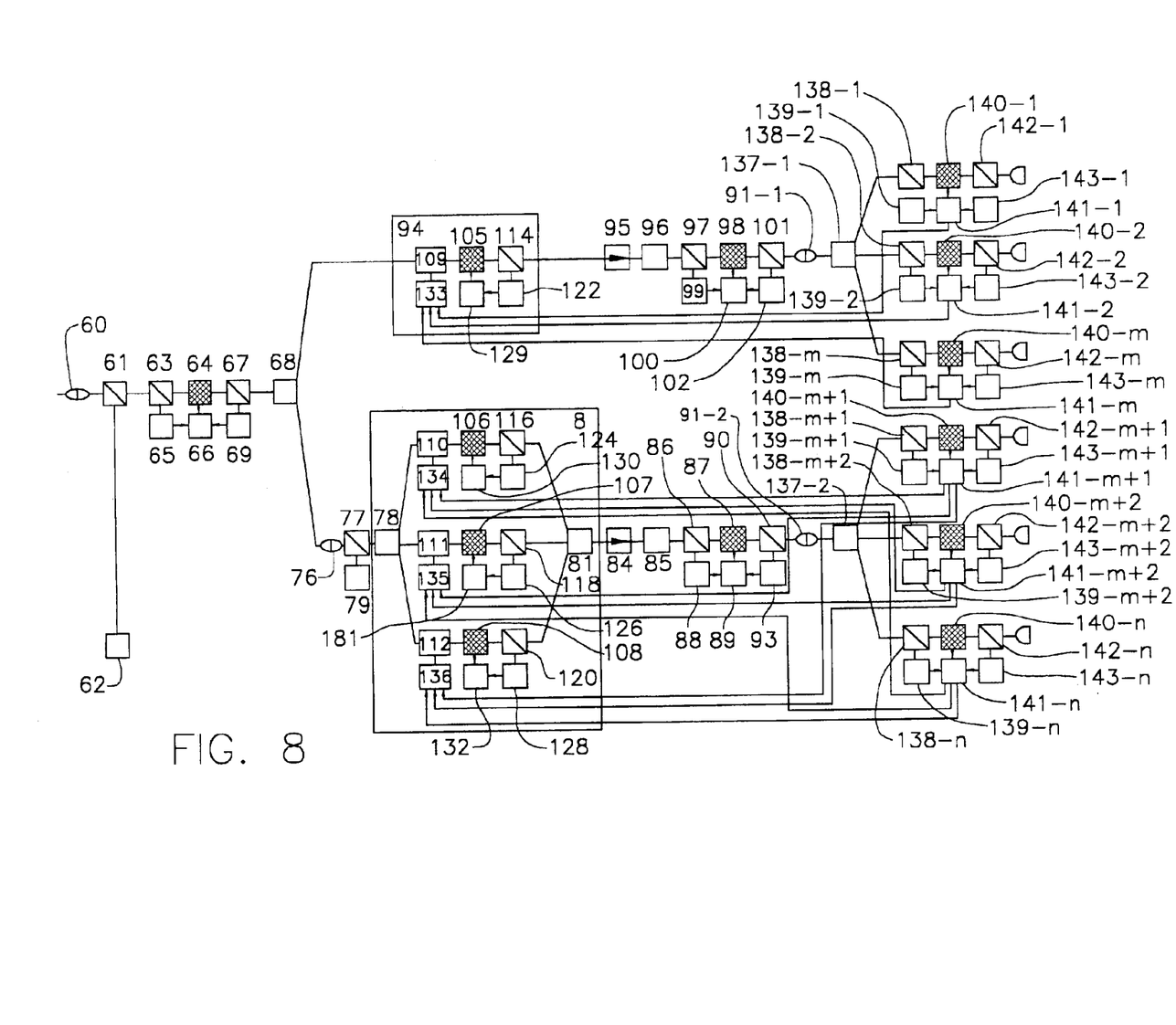
FIG. 8 is a block diagram of optical transmission equipment in accordance with an embodiment of the present invention.

Explanation will then be made in connection with another embodiment of the present invention wherein the wavelength gain characteristic shift slope filters 109, 110, 111 and 112 are controlled in a manner different from that in the embodiment of FIG. 1, with use of FIG. 8. The drawing is a block diagram of a optical transmission equipment in accordance with the embodiment of the present invention.

How to control the respective optical amplifiers and optical gain adjusters is substantially the same as that in the optical transmission equipment of the embodiment of FIG. 1. Wavelength multiplexed outputs of the optical amplifiers are supplied into optical demultiplexers 137-1 and 137-2 to be demultiplexed for each wavelength. The demultiplexed wavelengths are split respectively by optical splitters 138-1 to 138-n and monitored by light receivers 139-1 to 139-n for the respective wavelengths. With such an arrangement, the wavelength gain characteristic shift slope filters 109, 110, 111 and 112 are controlled so that the optical levels of the respective wavelengths become predetermined values.

Such an arrangement enables direct monitoring of the wavelength characteristics, thus increasing its control accuracy. Further, since the optical power auxiliary adjuster can be controlled not depending on the gains of the optical amplifiers within the optical amplification device, the optical transmission equipment can be increased in its control flexibility when actually used.

Optical gain adjusters 140-1 to 140-n and optical demultiplexers 137-1 and 137-2 have each such a structure as to utilize an optical power adjuster 8 which adjusts the respective signal wavelengths independently, and are arranged so that light receivers 143-1 to 143-n controllably monitor light split by optical splitters 141-2 to 142-n, thus obtaining a constant output level.

In this connection, the optical power adjuster 8 and fourth optical gain controller 94 may be located downstream of the optical demultiplexer 90 or 101.

Figure 9:
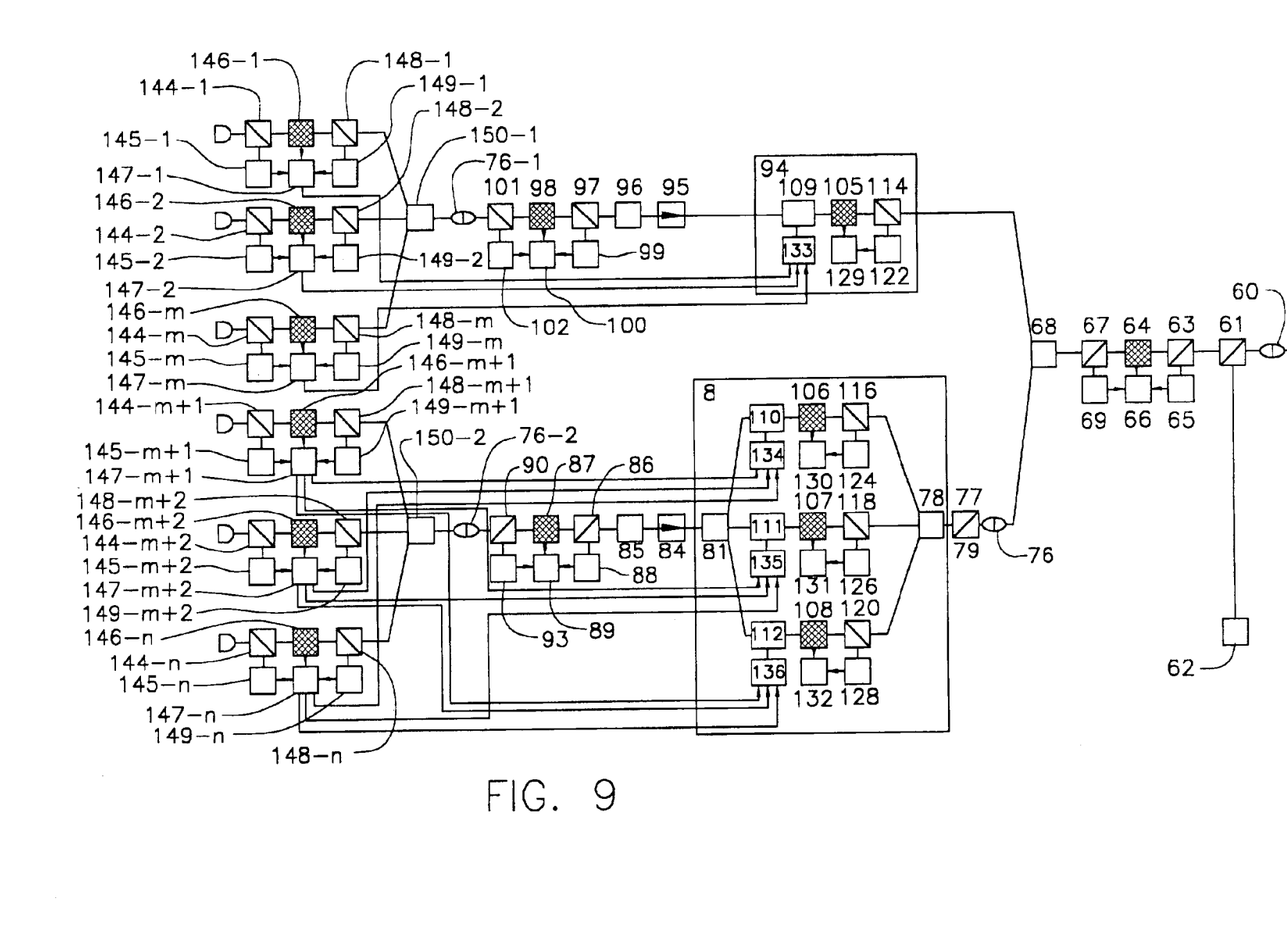
FIG. 9 is a block diagram of optical transmission equipment in accordance with an embodiment of the present invention.
Figure 10A:
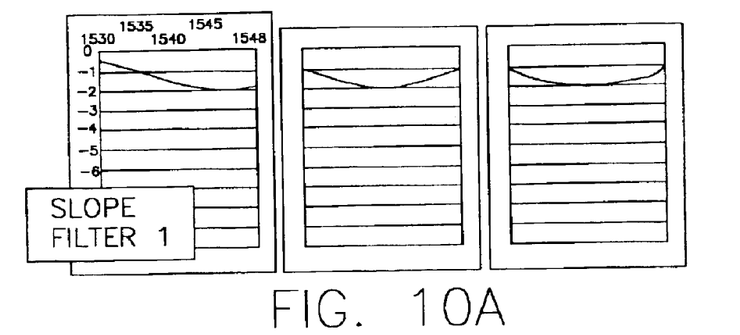
FIGS. 10A to 10D show wavelength transmission characteristics of slope filters 1 to 4, each showing the case of three different temperatures.
Figure 10B:
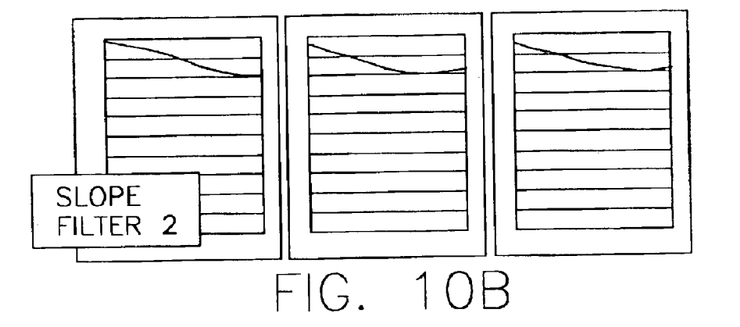
Figure 10C:
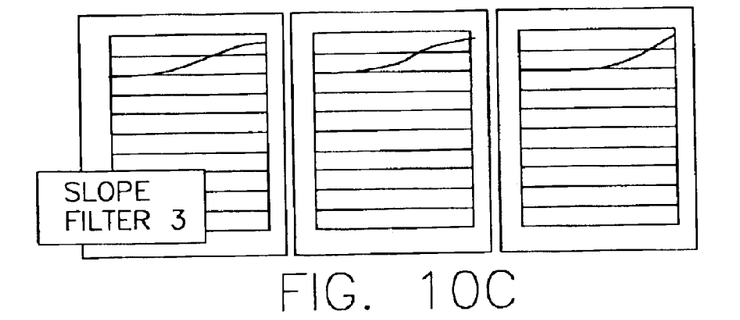
Figure 10D:
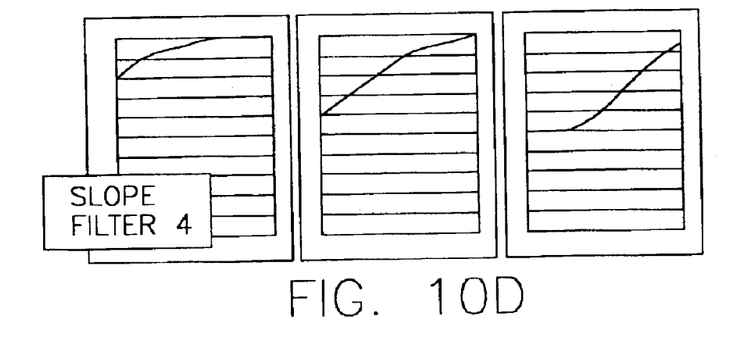

Explanation will be made in connection with an embodiment wherein the wavelength gain characteristic shift slope filters 109, 110, 111 and 112 are controlled in a manner different from that in FIGS. 1 and 8. FIG. 9 is a block diagram of optical transmission equipment in accordance with an embodiment of the present invention.

A method for controlling respective optical amplifiers and optical gain adjusters is substantially the same as that in FIGS. 1 and 8.

Optical gain adjusters 146-1 to 146-n and optical multiplexers 150-1 and 150-2 correspond each to an application of the optical power adjuster 8 which adjusts the respective signal wavelengths independently. Controllers 147-1 to 147-n are arranged so that light receivers 145-1 to 145-n detect the input light by monitoring light split by optical splitters 144-1 to 144-n and light receivers 149-1 to 149-n monitor light split by optical splitters 148-1 to 148-n, thereby controlling the controllerls 147-1 to 147-n and obtaining constant output levels.

The respective signal outputs are sent to the optical multiplexers 150-1 and 150-2 for their multiplexing.

With the present arrangement, the wavelength gain characteristic shift slope filters 109, 110, 111 and 112 are controlled so that the output light levels of the respective wavelengths are monitored and amplified with predetermined gain values.

In this connection, the optical power adjuster 8 and fourth optical gain controller 94 may be located upstream of the optical splitter 90 or 101.

Such an arrangement enables direct control of an amplification gain for an input signal gain, thus improving its control accuracy. Since the wavelength gain characteristic shift slope filter can be controlled not depending on the gains of optical amplifiers within the optical amplification device, the optical transmission equipment can increase its control flexibility when actually used.

The foregoing embodiments are featured in that the gain characteristic of the rare-earth-element-doped optical fiber as the optical amplifying medium is regarded as a curve having a plurality of inflection points and wavelength division is carried out substantially in the vicinity of the inflection points. Each divided wavelength band is located between the inflection points. With such a division arrangement, a gain deviation actually occurred at a wavelength band can be replaced with a gain deviation as if continuously occurred at different wavelength bands. As has been explained above in detail, if the gain adjusters which can adjust the wavelength bands independently are not divided by the aforementioned design method, the gain cannot be replaced with a continuous gain change. For this reason, the effect of the present embodiment is great.

With respect to a general optical filter, great efforts are directed toward a design to reduce its temperature dependency. Meanwhile, an optical filter possessed by the optical power auxiliary adjuster of the present invention is featured in that the filter has a large temperature characteristic.

The function realizable by the present invention is to make gain characteristics of originally different wavelength bands appear in desired wavelength bands to obtain a desired gain characteristic by changing the temperature. For facilitating the realization of this function, a narrow required temperature variable width is valid from the control viewpoint. To this end, an optical filter having a large temperature dependency is necessary.

This system of realizing it merely by shifting the gain characteristics present across the originally-different wavelength bands can have a simple arrangement and can be controlled functionally easily with an improved reliability.

Although the temperature control method has been employed as the method for making the gain characteristics of the originally-different wavelength bands appear in the desired wavelength bands to obtain a desired gain characteristic in the present embodiment, the present invention is not necessarily limited to this arrangement. For example, a method for changing the wavelength characteristics spectrally to obtain a desired gain characteristic may be employed.

The optical gain adjuster can adjust a light power of a band and a gain deviation in the band simultaneously. However, when emphasis is laid on the light power adjustment to the contrary, a compensation for the gain deviation may become lack. Meanwhile, the wavelength gain characteristic shift slope filter can adjust the gain deviation but at the same time can cause a change of a loss in the band, thus changing the light power in the band. In other words, when the optical gain adjuster and wavelength gain characteristic shift slope filter are provided separately at the same time, the effects of the adjuster and filter can be mutually complemented, thus leading to an additional improvement over the effect of the prior art.

By adding the wavelength gain characteristic shift slope filter to the optical gain adjuster, the gain deviations caused by the optical amplifiers within the optical amplification device can be effectively adjusted. Further, gain deviations accumulated from an optical amplification device at a preceding stage, which results in a problem when the optical amplification devices are connected in multiple stages, can be sufficiently corrected and adjusted (the gain deviations will not be accumulated even when the gain deviations take place in the preceding-stage optical amplification device), whereby the transmission system can be largely improved.

In the foregoing embodiments, the wavelength gain characteristic shift slope filter is not limited to the illustrated position but may be installed, for example, at the preceding or subsequent stage of the optical gain adjuster.

The wavelength gain characteristic shift slope filter for dynamically equalizing its gain according to its input level can be implemented. Further, there can be provided optical transmission equipment which can effectively utilize wavelength bands suitable for wavelength division multiplexing. Furthermore, there can be provided an optical transmission method suitable for wavelength division multiplexing.

What is claimed is:

1. An optical transmission equipment comprising:

a demultiplexer for receiving an optical signal including a plurality of different wavelength signals, said demultiplexer demultiplexing the received optical signal into a plurality of predetermined wavelength-band optical signals;

a plurality of optical gain adjusters for adjusting gains of the respective optical signals provided by said demultiplexer;

a plurality of filter units for compensating for wavelength gain characteristics according to input levels of respective wavelength-band optical signals provided by said optical gain adjusters; and at least one optical amplifier for amplifying optical signals provided by said filter units, wherein said demultiplexer divides the wavelength bands at inflection points of wavelength gain characteristics of said optical gain adjusters, wherein said filter unit includes a plurality of wavelength gain characteristics shift slope filters connected in cascade so as to provide a continuous wavelength gain characteristic, each wavelength gain characteristic shift slope filter including an optical filter which changes wavelength gain characteristic depending on a temperature and a Peltier element for controlling the temperature of the optical filter, wherein the optical filters in respective wavelength gain characteristic shift slope filters are different in wavelenght gain characteristic and a Peltier element in each wavelength gain charachteristic shift slope filter is independently controlled in accordance with the input level of the optical signal.

2. An optical transmission equipment comprising:

a demultiplexer for receiving an optical signal including a plurality of different wavelength signals, said demultiplexer demultiplexing the received optical signal into a plurality of predetermined wavelength-band optical signals;

a plurality of optical gain adjusters including a first impurity-doped fiber and a first exciting light source for adjusting gains of the respective optical signals provided by the demultiplexer;

a plurality of wavelength gain characteristics shift slope filters connected in cascade for compensating for wavelength gain characteristics of the respective wavelength-band optical signals provided by the optical gain adjusters, each wavelength gain characteristics shift slope filter including an optical filter which changes wavelength gain characteristics depending on a temperature and a Peltier element for controlling the temperature of the optical filter; and at least one optical amplifier including a second impurity-doped fiber and a second exciting light source for amplifying optical signals provided by said wavelength gain characteristics shift slope filters;

wherein said demultiplexer divides the wavelength-band of the received optical signal at inflection points of wavelength gain characteristics of the first impurity-doped fibers of said optical gain adjusters, wherein the optical filters in respective wavelength gain characteristics shift slope filters are different in wavelength gain characteristics and the Peltier element in each wavelength gain characteristics shift slope filter is independently controlled in accordance with input level of the optical signal.

3. An optical transmission equipment comprising:

a demultiplexer for receiving an optical signal including a plurality of different wavelength signals, said demultiplexer demultiplexing the received optical signal into a plurality of predetermined wavelength-band optical signals;

a plurality of an optical gain adjusters for adjusting gains of the respective optical signals provided by said demultiplexer;

a plurality of filter units for compensating for wavelength gain characteristic according to input levels of respective wavelength-band optical signals provided by said optical gain adjusters; and at least one optical amplifier for amplifying optical signals provided by the filter units, wherein said demultiplexer divides the wavelength-bands at inflection points of wavelength gain characteristic of said optical gain adjusters, wherein said filter unit includes a plurality of wavelength gain characteristic shift slope filters connected in cascade, each wavelength gain characteristics shift slope filter including an optical filter which changes wavelength gain characteristic, so as to provide a continuous wavelength gain characteristics;

wherein the optical filters in respective wavelength gain characteristics shift slope filters are different in wavelength gain characteristic.

4. An optical transmission equipment comprising:

a demultiplexer for receiving an optical signal including a plurality of different wavelength signals, said demultiplexer demultiplexing the received optical signal into a plurality of predetermined wavelength-band optical signals;

a plurality of optical gain adjusters including a first impurity-doped fiber and a first exciting light source for adjusting gains of the respective optical signals provided by the demultiplexer;

a plurality of wavelength gain characteristics shift slope filters connected in cascade for compensating for wavelength gain characteristics of the respective wavelength-band optical signals provided by the optical gain adjusters, so as to provide a continuous wavelength gain characteristics, each wavelength gain characteristic shift slope jfilter including an opical filter which changes wavelength gain characteristic; and at least one optical amplifier including a second impurity-doped fiber and a second exciting light source for amplifying optical signals provided by wavelength gain characteristic shift slope filters;

wherein said demultiplexer divides the wavelength-band of the received optical signal at inflection points of wavelength gain characteristics shift slope filters are different in wavelength gain characteristic.

5. An optical transmission system comprising a plurality of optical transmission equipments connected in multiple stages, wherein each optical transmission equipment has a structure as claimed in claim 1, wherein said wavelength bands into which said demultiplexer of each optical transmission equipment demultiplexes can be set independently of other optical transmission equipments.

6. An optical transmission system comprising a plurality of optical transmission equipments connected in multiple stages, wherein each optical transmission equipment has a structure as claimed in claim 2, wherein said wavelength bands into which said demultiplexer of each optical transmission equipment demultiplexes can be set independently of other optical transmission equipments.

7. An optical transmission system comprising a plurality of optical transmission equipments connected in multiple stages, wherein each optical transmission equipment has a structure as claimed in claim 3, wherein said wavelength bands into which said demultiplexer of each optical transmission equipment demultiplexes can be set independently of other optical transmission equipments.

8. An optical transmission system comprising a plurality of optical transmission equipments connected in multiple stages, wherein each optical transmission equipment has a structure as claimed in claim 4, wherein said wavelength bands into which said demultiplexer of each optical transmission equipment demultiplexes can be set independently of other optical transmission equipments.

* * * * *